United States Patent [19]

Kofink

[11] 4,222,001

[45] Sep. 9, 1980

[54] SELF-EXCITED DYNAMO-ELECTRIC MACHINES WITH IMPROVED START-UP CHARACTERISTICS

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 6,920

[22] Filed: Jan. 26, 1979

[30] Foreign Application Priority Data

Feb. 16, 1978 [DE] Fed. Rep. of Germany ....... 2806597

[51] Int. Cl.$^2$ ............................................. H02P 9/30
[52] U.S. Cl. ......................................... 322/60; 322/81
[58] Field of Search ...................... 322/44, 60, 73, 81, 322/25

[56] References Cited

U.S. PATENT DOCUMENTS

| | | | |
|---|---|---|---|
| 3,152,298 | 10/1964 | Byles | 322/81 X |
| 3,217,229 | 11/1965 | Ballard | 322/73 X |
| 3,378,753 | 4/1968 | Poppinger et al. | 322/60 X |
| 3,599,080 | 8/1971 | Bennett | 322/60 X |
| 3,611,112 | 10/1971 | Lehinoff | 322/60 X |

*Primary Examiner*—Robert J. Hickey
*Attorney, Agent, or Firm*—Frishauf, Holtz, Goodman & Woodward

[57] ABSTRACT

In known generators and motors a regulator circuit connected in series with the exciter winding creates too much resistance to allow self-excitation to start at very low speeds. The regulator circuit is therefore shunted by a positive temperature coefficient resistor. This has very low resistance at low temperatures causing sufficient current flow through the exciter winding even at low speeds.

4 Claims, No Drawings

SELF-EXCITED DYNAMO-ELECTRIC MACHINES WITH IMPROVED START-UP CHARACTERISTICS

The present invention relates to apparatus for improving the self-excitation of generators and, in particular, the self-excitation of AC generators used in motor vehicles.

BACKGROUND AND PRIOR ART

In known generators of this type, the excitation current through the exciter winding is derived from the main current in the generator; for some AC generators by means of separate exciter diodes. When the generator starts up, self-excitation takes place because of the small remanent voltage in the generator. The latter results from the fact that residual magnetism in the iron core causes a small electromotive force to be generated in the winding. This small electromotive force (emf) generates a small current in the closed circuit of the exciter winding so that a small amount of electromagnetism is added to the remanence, reinforcing its effect. The emf thus continually increases until the desired emf corresponding to the rotary speed of the generator has been reached. This takes place within a very short time.

This type of self-excitation is decreased by the resistance of the regulator circuit connected in series with the exciter winding. The regulator circuit may, for example, be the emitter-collector circuit of the output transistor of the current regulating circuit. Other circuit elements connected in series with the exciter winding are, for example, the exciter diodes and, for some AC generators, the so-called minus diodes, that is the diodes connected to the negative DC output terminal. Since the main control circuit of the regulator is connected in series with the exciter of field winding of the generator and since the voltage across this regulator circuit may be as much as 1.5 volts, either external excitation of the AC generator must be supplied during start-up or the generator will deliver a useful output only after reaching a relatively high speed. This is a distinct disadvantage since modern AC generators in motor vehicles should be able to supply a charging current even at idling speeds. Further the possibility exists that excitation by means of the battery may not be possible.

THE INVENTION

It is an object of the present invention to furnish self-excitation apparatus which does not require preexcitation and which allows the generator to furnish charging current even at very low speeds.

It is a further object of the present invention to provide such apparatus without changing the conventional regulating apparatus and without much additional cost.

In accordance with the present invention, a positive temperature coefficient resistor is connected in parallel with the regulator circuit means which are connected in series with the field winding. The resistance of the positive temperature coefficient resistor is initially very low and increases due to self-heating to approximately 20 times its original value with a time constant of approximately one second.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

The apparatus of the present invention may be utilized anywhere in electrical machines, that is generators and motors, wherein regulator circuits are connected in series with the exciter winding. In general the regulator circuit connected in series with the exciter winding will be the emitter-collector circuit of the output stage of the current regulating circuit. As previously mentioned, such circuit elements connected in series with the exciter winding constitute undesired resistances when it is desired that self-excitation set in very early during start-up of the generator or motor.

Figure 1:
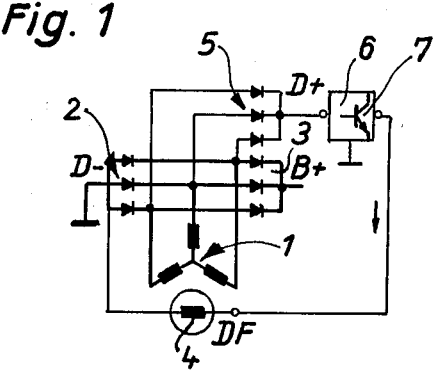
FIG. 1 is a schematic diagram illustrating the construction of a known AC genrator.

The basic construction of a modern AC generator in which the present invention may well be utilized is shown in FIG. 1. The AC generator shown in FIG. 1 has a three-phase stator winding 1 which furnishes a three-phase AC current. The latter is rectified by two sets of semiconductor diodes, namely the so-called minus diodes 2 and plus diodes 3. The rotating magnetic field is generated in an exciter winding 4 mounted on the rotor shaft of the generator. The exciter winding is energized by DC current and the individual magnetic poles are created by the shape of the rotor. The exciting current is derived from the stator winding via three exciter diodes 5 and flows from the positive D+ of regulating circuit 6 to terminal DF of exciter winding 4. Regulating circuit 6 includes at least one output transistor 7 through whose collector-emitter circuit the exciter current flows. The current is aplied to the exciter winding by means of slip rings and carbon brushes.

Figure 2:
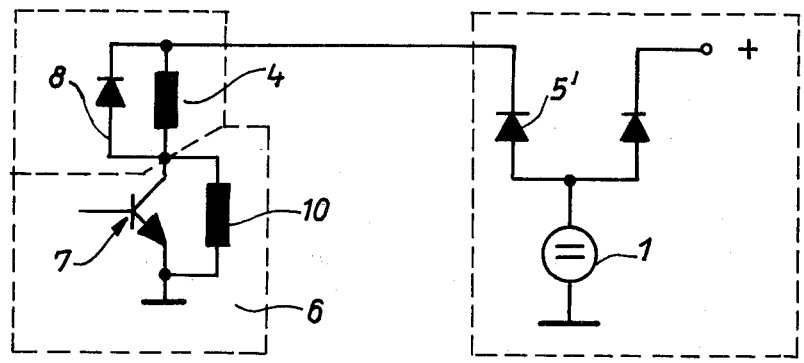
FIG. 2 is a simplified schematic diagram showing the essential elements of the present invention.

The field or exciter winding 4 is shown again in FIG. 2 together with a diode 8 connected in parallel with field winding 4. In this simplified representation the collector-emitter circuit of output transistor 7 of regulating circuit 6 is connected in series with exciter winding 4. Current is supplied from stator 1 of the AC generator through an exciter diode 5'. It will be noted that the very small voltage generated because of the remanence in the iron core is dropped almost completely cross the emitter-collector circuit of transistor 7 and that, therefore, a self-reinforcing self-excitation of the generator cannot take place at low generator speeds. Such self-generation takes place only much later at a relatively high engine speed. In order to eliminate this disadvantage, a positive temperature coefficient resistor 10 is connected in parallel with the emitter-collector circuit of transistor 7. The resistance of resistor 10 is very low when the resistor is cold as it is during the start-up of the generator. For such a very low resistance, even the small remanence voltage of the generator is sufficient to cause a current flow which allows self-excitation. This self-excitation thus takes place at substantially lower generator speeds, since the high resistance of the output transistor is no longer effective.

Under normal operating conditions of the generator, resistor 10 has a high resistance. Specifically, its resistance may, through self-heating, increase to about 20 times its original value, so that its effect on the regulation by transistor 7 is negligible. Since the thermal time constant of resistor 10 is low, that is in the order of one second, the presence of resistor 10 will not affect the circuit for any substantial time after the initial startup.

Figure 3:
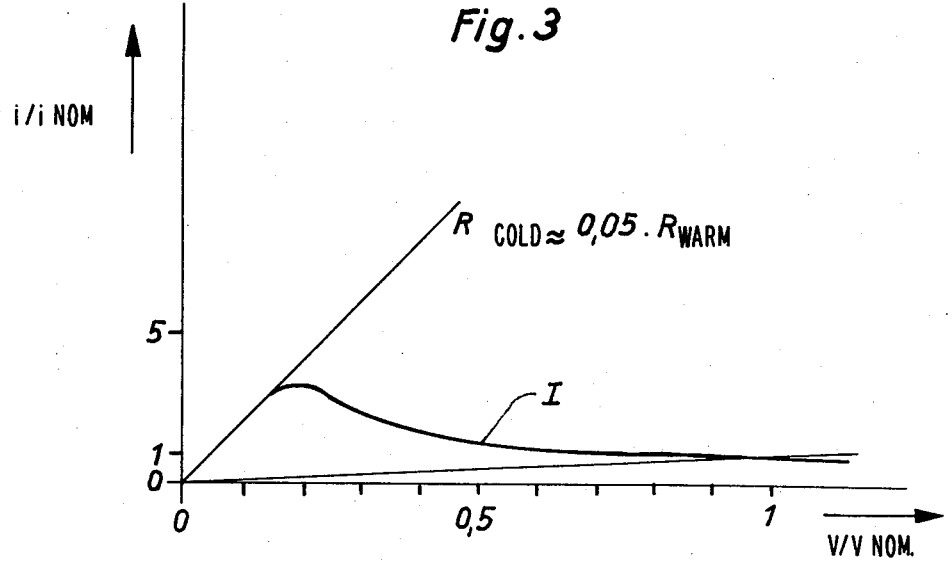
FIG. 3 is a typical VI characteristic curve of a positive temperature coefficient resistor suitable for use in the apparatus shown in FIG. 2.

In FIG. 3 the ratio of actual to nominal current is plotted as a function of the ratio of actual to nominal voltage for a positive temperature coefficient resistor suitable for the present invention. The straight line marked R indicates the resistance when resistor 10 is cold, while the curve marked $R_{warm}$ indicates the corresponding behavior in a warm condition. The curve marked I illustrates the transitional behavior which takes place within a very short time during warm-up. The absolute cold resistance of resistor 10, in a preferred embodiment is about 50Ω while the emitter-collector resistance of transistor 7 for the same embodiment is about 7000Ω.

Various changes and modifications may be made within the scope of the inventive concepts.

I claim:

1. In a self-excited generator having an exciter winding and regulator circuit means connected in series with said exciter winding for regulating the flow of current therethrough, apparatus for improving the self-excitation of said generator, said apparatus comprising
positive temperature coefficient resistor means (10) having a resistance increasing substantially with increasing temperatures connected in parallel with said regulator circuit means, whereby said current flowing through said exciter winding at start-up of said generator is substantially increased.

2. A generator as set forth in claim 1, wherein said resistance of said positive temperature coefficient resistor increases by a factor of approximately 20 due to self-heating with a thermal time constant of approximately one second.

3. A generator as set forth in claim 1, wherein said regulator circuit means has a predetermined resistance; and wherein said resistance of said positive temperature coefficient resistor at said start-up is less than said predetermined resistance.

4. A generator as set forth in claim 1, wherein said regulator circuit means comprise the emitter-collector circuit of a transistor.

* * * * *